P. O. KAFFKE.
LIFTING TONGS FOR FRUIT JARS.
APPLICATION FILED DEC. 13, 1907.
911,996.
Patented Feb. 9, 1909.
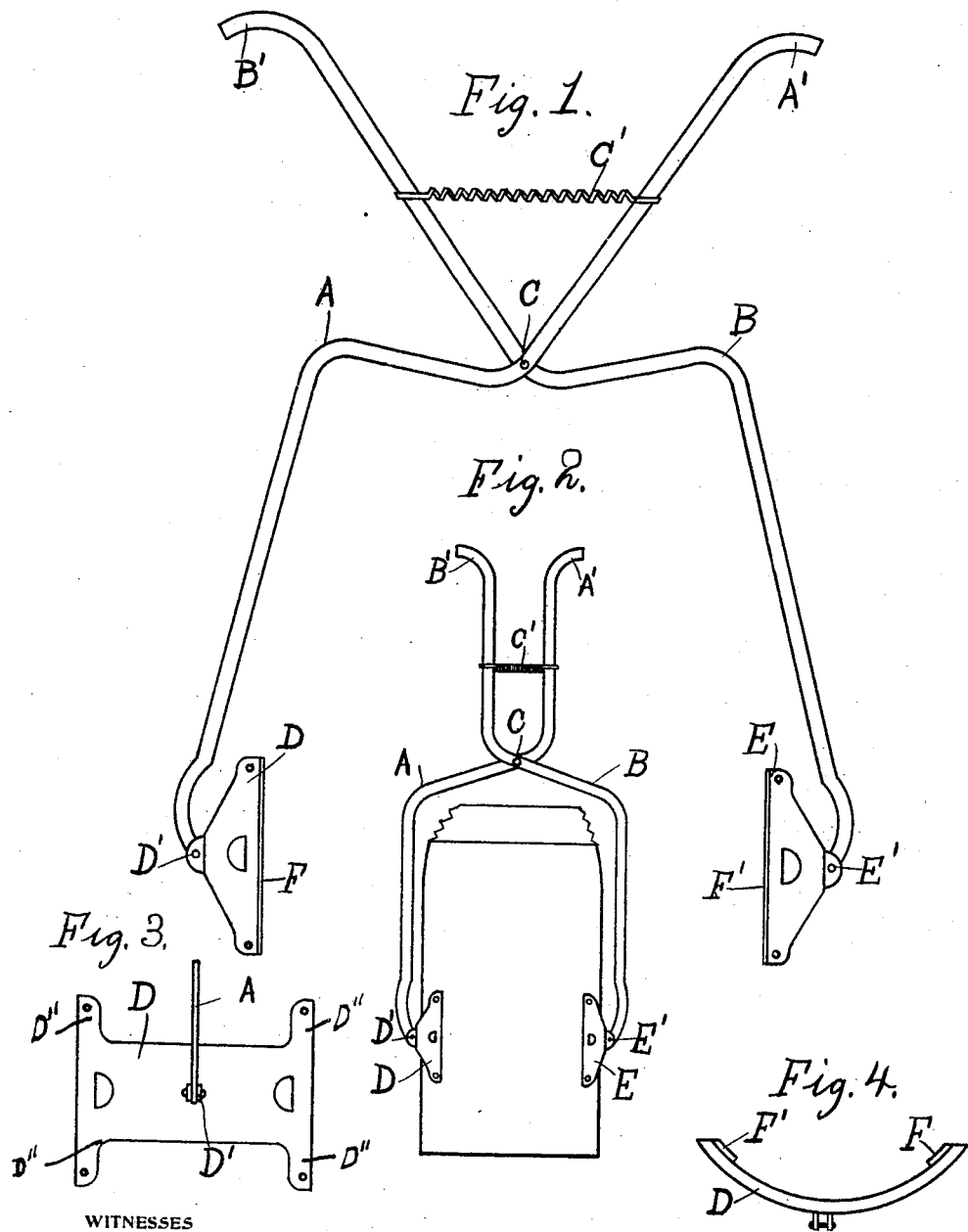

UNITED STATES PATENT OFFICE.

PAUL O. KAFFKE, OF EASTON, PENNSYLVANIA.

LIFTING-TONGS FOR FRUIT-JARS.

No. 911,996.     Specification of Letters Patent.     Patented Feb. 9, 1909.

Application filed December 13, 1907. Serial No. 406,291.

*To all whom it may concern:*

Be it known that I, PAUL O. KAFFKE, a citizen of the United States, residing at Easton, county of Northampton, and State of Pennsylvania, have invented a certain new and useful Improvement in Lifting-Tongs for Fruit-Jars, of which the following is a specification.

My invention relates to a new and useful improvement in lifting tongs for fruit jars, and has for its object to provide an exceedingly simple and effective device of this character by means of which fruit jars after being in hot water the desired length of time may be readily taken therefrom without placing the hands therein, thus preventing the hands from being scalded.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1 is a side elevation of my improved lifting tongs for fruit jars showing them in the open position. Fig. 2, a side elevation thereof showing them closed about a fruit jar. Fig. 3, a back view of one of the engaging members, a part of the handle being broken therefrom, and Fig. 4, a plan view thereof, the handle being removed therefrom.

In carrying out my invention as here embodied A and B represent two members which may be made of any suitable material such as wire, steel, etc., pivoted at C after the manner of tongs. To some suitable portion of these said members may be fastened the spiral spring C', if desired. The upper ends of these members are formed into the handles A' and B' so that they may be easily manipulated; to the opposite end of these members are pivoted the engaging members D and E at D' and E'. The engaging members are curved as plainly shown in Fig. 4 so that they may be readily clamped around the jar. As depicted in Fig. 3 the engaging members are formed of plates of sheet metal the opposite sides of which are extended at the ends thereof as at D''. On the outer ends of the said engaging members are fastened by any suitable means the strips of rubber F and F' so that when they come in contact with fruit jars it will be next to impossible for a fruit jar to slip therefrom.

By providing the extensions D'', longer strips of rubber can be employed, which results in an increased gripping surface. Since the rubber strips are spaced apart and extend transversely of the engaging members, the jar will be gripped at four distinct and separate points.

When persons are canning fruit they place the jars in water over a fire so that the air can be driven from the jars; in a short time the jars become very hot and it is very difficult to remove them from the hot water, but my improved tongs may be readily placed about a jar and the same lifted from the water.

Having thus fully described my invention, what I claim as new and useful, is—

Lifting tongs for fruit jars and the like consisting of a pair of pivoted elements, an engaging member pivoted to each element, each member being formed of a curved section of sheet metal having a projection at each of its four corners; strips of rubber secured to the inner face of each member and extending transversely of the latter and throughout the length of the adjacent projections, said rubber strips being in spaced relation and said elements being pivoted to said engaging members at points midway in the space between said rubber strips.

In testimony whereof, I have hereunto affixed my signature in the presence of two subscribing witnesses.

PAUL O. KAFFKE.

Witnesses:
J. E. STRAUB,
F. H. RAUB.